United States Patent [19]
Hinckley

[11] Patent Number: 5,828,882
[45] Date of Patent: Oct. 27, 1998

[54] EVENT NOTIFICATION FACILITY

[75] Inventor: Mark Andrew Hinckley, Lindon, Utah

[73] Assignee: Novell, Inc., Orem, Utah

[21] Appl. No.: 617,961

[22] Filed: Mar. 15, 1996

[51] Int. Cl.[6] .................................................. G06F 9/40
[52] U.S. Cl. ............................................................. 395/680
[58] Field of Search .................................... 395/680, 671; 707/8

[56] References Cited

U.S. PATENT DOCUMENTS

| | | | |
|---|---|---|---|
| 4,432,057 | 2/1984 | Daniell et al. | 707/8 |
| 5,212,789 | 5/1993 | Rago | 707/8 |
| 5,305,454 | 4/1994 | Record et al. | 395/682 |
| 5,430,875 | 7/1995 | Ma | 395/682 |
| 5,440,726 | 8/1995 | Fuchs et al. | 395/182.18 |

OTHER PUBLICATIONS

Tomlinson, Paula, "Using Windows NT Event Logging", Windows Developer's Journal, p. (16), Jul. 1994.
Ford, Dan, "Associations in C++", Dr. Dobb's Journal, p. (10), Aug. 1994.

Primary Examiner—Alvin E. Oberley
Assistant Examiner—St. John Courtenay, III
Attorney, Agent, or Firm—Cesari and McKenna, LLP

[57] ABSTRACT

An event notification facility includes an interface by which programs register for notification of an event. When registering, each program identifies a type of event and a mechanism by which the program is to be notified if and when an event of the identified type occurs. At the program's option, it can request that it be notified "last," i.e. after all other programs have been notified of the event. The event notification facility also includes a means for storing the registration requests and for associating each registration request with a type of event. Once a program is registered to be notified of an event last, the event notification facility rejects all other requests from programs to be notified of the same event last, however preferably other programs can still register for notification of the event. Finally, the event notification facility includes a means for notifying each registered program when the event occurs.

20 Claims, 2 Drawing Sheets

EVENT NOTIFICATION FACILITY

BACKGROUND OF THE INVENTION

1. Field of the Invention

The invention relates to computer operating systems and more particularly to event notification facilities within these operating systems.

2. Description of the Related Art

A computer operating system manages a computer's hardware and software resources and perform tasks, such as performing input/output (I/O) operations for programs and scheduling the programs to be executed by the computer. Most operating system include a facility to notify programs of the occurrence of "events," such as a completion of an I/O operation or a failed attempt by a user to gain access ("log in") to the computer. Each of these event notification facilities enables a second program to perform an operation as a result of an event that occurs in a first program, without requiring the first program to explicitly notify the second program. I herein refer to "events" and "notification," although some operating systems use other terminology to refer to analogous concepts. For example, in the Unix operating system, events are referred to as "signals" and in the VMS operating system, programs are notified of events by setting "event flags" or by passing control to routines called "asynchronous system traps" (ASTs).

Programs typically "register" with an event notification facility. Each registration specifies a type of event and an address of a "handler" routine that is to be called by the operating system if and when the event occurs. When the event occurs, the operating system calls the routine and, depending on the event, might pass parameters that describe the event to the routine. Sometimes several programs register for notification of the same event. For example, accounting software requires notification of successful log-ins and logouts to calculate charges for use of a computer. In addition, a security monitor might require notification of login attempts to detect suspicious behavior, such as a successful login following several failed attempts, which might indicate a break-in. When an event occurs, the operating system notifies all programs that have registered for the event by calling their respective handler routines. Some operating systems notify the programs in the order in which the programs register, while in other operating systems the order of notification depends on the order in which the programs happen to be scheduled for execution.

In a transaction-oriented application, such as an airline reservation or banking system, a "transaction" typically involves adding and/or modifying (hereinafter collectively referred to as "writing") records in several disk files and can involve additional steps, such as checking a user's privileges. For example, a funds-transfer transaction might check whether a customer's assets are frozen, and if they are not, debit the user's record in a checking account file and credit the user's record in a savings account file. Ideally, database software ensures that each transaction either completes successfully or the database behaves as though the transaction was never attempted, i.e. the database software does not allow partial transactions and never leaves the files partially written. A partial transaction, i.e. partially-written files, can corrupt the database because data in the database is not self-consistent. If any aspect of a transaction fails, the whole transaction is aborted and the database software "rolls back" the files to their states before the transaction began. Circumstances that can cause the transaction to fail include: a hardware failure while writing to one of the files; a disk having insufficient space to add a record; and a user who initiated the transaction lacking sufficient privileges to access one of the files. Typically, the database software registers for notification of all the events that would cause the transaction to fail. Receiving such a notification during a transaction then causes the database software to roll back the appropriate files.

"Auditing" involves recording, typically in a log file, each event that is considered to be significant, such as modifying a record in a database or attempting to login. Such a log file provides an audit trail that can be used forensically to diagnose past actions performed by users and failures in computer software and hardware. An audit log can be used, e.g., to provide accountability for the accuracy of data in a database and to detect attempts at unauthorized access to a computer system; this is primarily because an audit record typically includes the identity of the user and program attempting each auditable event along with other information, such as the time and date on which the event occurred. When auditing is performed, every occurrence of an auditable event should be logged; otherwise the audit log does not provide a true audit trail and its usefulness is compromised. If an auditable event cannot be logged, e.g. because the log file is full, the event should not be permitted to occur.

Event notification is commonly used in database applications. For example, when an object is added to one file of a replicated database, an "add object" event notifies database software to add replicas of the object to other files of the database. Typically, several event handlers, including an auditor, are involved in performing the steps necessary to add the replicas. The auditing should be performed only after all the other steps have been completed so an audit record can include information about all of the steps and a final status (success or failure) of the entire transaction. However, conventional operating systems, even those that call event handlers in the order in which the handlers are registered, cannot ensure that no handler is called after the auditor. Problematically, the result of operations performed by a post-audit handler are not included in the audit record because they occur after the auditor writes the audit record. In an exemplary scenario, although pre-audit steps might succeed such that the auditor writes a "success" audit record, the post-audit hander step might fail causing the transaction to be rolled back. Consequently, the audit log indicates the transaction succeeded but the database is left as though the transaction never occurred.

Furthermore, a failure in the auditor should abort the entire transaction and prevent a post-audit handler from performing steps thereafter. In another exemplary scenario, pre-audit steps succeed, the auditor fails and the pre-audit steps are rolled back; however if a post-audit handler later writes to a file and the audit log indicates the transaction was aborted, the database has been partly modified. This results in an incorrect and likely corrupt database state.

In some operating systems, particularly network operating systems such as NetWare, database operations are tightly coupled to the operating system to ensure that event handlers are invoked in a timely manner. For example, certain event handlers (so called "synchronous" or "in-line" handlers) are executed by the same "thread" that detects the event, i.e. the handler executes in the same context as the event. Other event handlers (so called "asynchronous" handlers), including those that register for the same event as the in-line handlers, are typically scheduled for execution after the event occurs because, e.g., they execute in a different process context. However, most event notification facilities do not allow a registering program to specify whether the handler is to be executed synchronously or asynchronously.

Furthermore, to ensure timely notification, synchronous event notification is conventionally accomplished by tightly coupling the operating system and software that generates the events to the software that handles those events. Such tight coupling prevents a vendor from distributing a new version of either the database software or the operating system without also distributing the other. This in turn, delays the distribution of new features and maintenance releases of the software. Such tight coupling also poses problems for third-party vendors that develop software, e.g. an auditing facility, with features that augment the database software because the monolithic nature of the system generally does not provide an appropriate interface for third-party software.

SUMMARY OF THE INVENTION

The invention provides an event notification facility for notifying one or more registered programs of the occurrence of a selected event and, upon request from only one of those programs, for ensuring that the one program is notified after all the other programs. The novel facility preferably comprises an interface by which programs register for notification of an event. When registering, each program identifies a type of event and a mechanism by which the program is to be notified if and when an event of the identified type occurs. According to an aspect of the invention, the program can request that it be notified "last," i.e. after all other programs have been notified of the event (also referred to hereinafter as "final" notification). Moreover, the program can supply control information that further identifies or limits circumstances under which the program is to be notified when the event occurs.

The event notification facility includes a means for storing the registration requests and for associating each registration request with a type of event. In the illustrative embodiment, each stored registration request contains control information that: (i) identifies the mechanism for notifying the registered program and (ii) instructs the event notification facility whether to notify that program last. Once a program registers for final notification of an event, the event notification facility rejects all other program requests to be notified for that event last; however, other programs can still register for "non-last" notification of the event. In an alternative embodiment, each stored registration request can contain additional control information that identifies or limits circumstances under which the registered program is to be notified when the associated event occurs. For example, this additional control information can prevent the event notification facility from notifying the registered program unless the event represents a successful operation or, optionally, a failed operation.

Furthermore, the inventive facility includes a means for notifying each registered program (unless prevented from doing so by the additional control information) when an event occurs, the notifications being performed according to the stored registration requests associated with the type of the event. Here, notification can be effected by calling a handler routine, setting a flag, incrementing a counter, creating a process, unblocking a thread of execution or by any similar control, synchronization or scheduling mechanism.

Information, such as a result code, associated with an event might also be sent to each notified program. For example, when a new user is added to a computer system, the applicable software adds a record to a database of authorized users. The name of the user can be associated with an "add object" event so programs that are notified of this event can also be notified of the user's name to, e.g. update an electronic-mail address book. Each notified program can further modify the information so, e.g., a notified program can force an otherwise-successful event to fail. In other words, each notified program can modify the result code that is passed to the next program notified of the same event.

The novel event notification facility can be used to particular advantage with, e.g., a tightly-coupled, replicated database system where an auditor can register to be notified last of an "add object" event. Final notification ensures that (i) the audit record written by the auditor accurately reflects all the steps taken to add replicas of the object, (ii) no post-audit handler can be executed, and (iii) the database remains uncorrupted. Furthermore, the ability to register for synchronous or asynchronous notification enables decoupling of such tightly-coupled systems and then facilitates third-party development of software that augments features of the database software.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
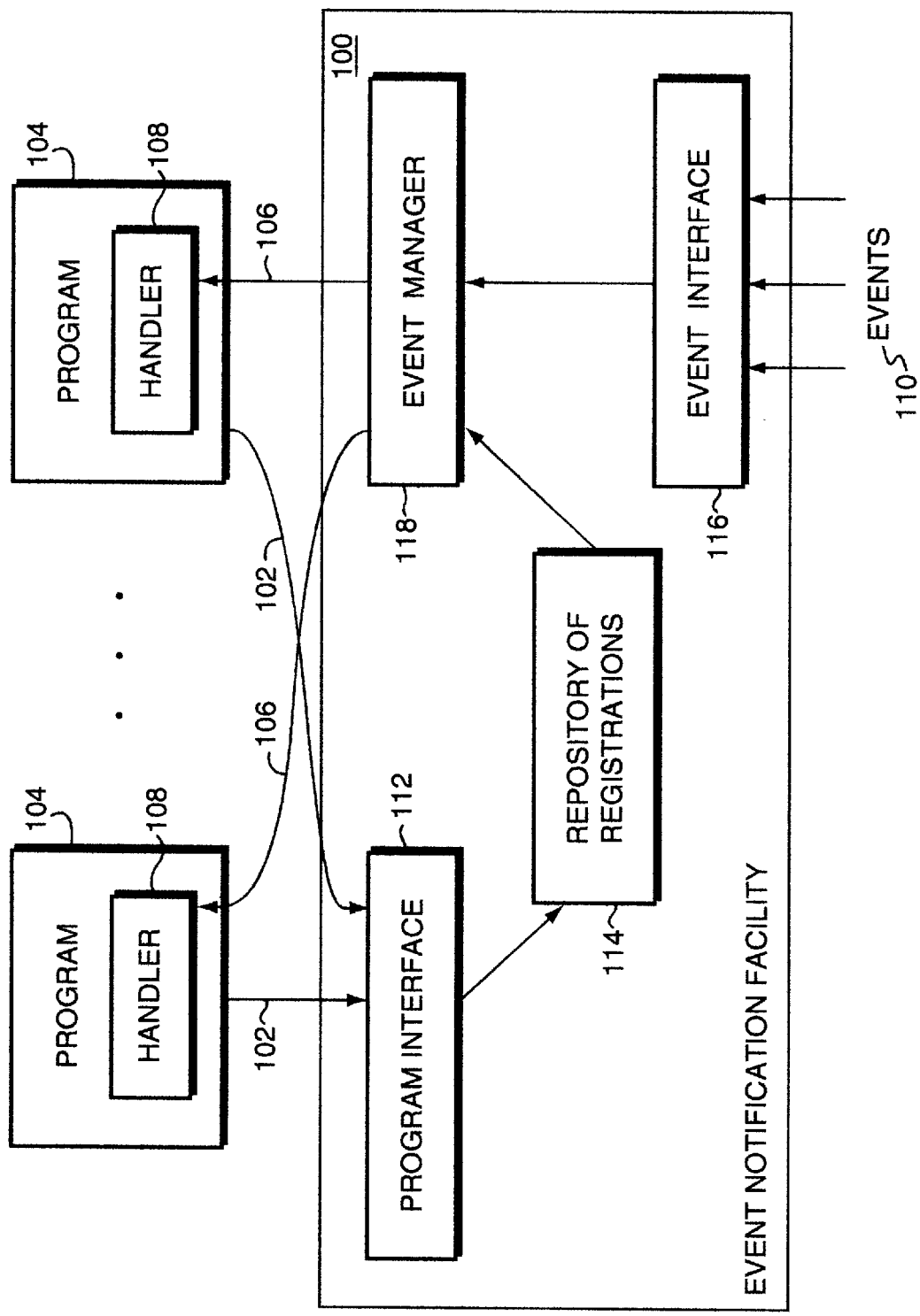
FIG. 1 is a block diagram of an event notification facility according to the present invention.

FIG. 1 illustrates an event notification facility 100 that receives registration requests 102 from programs 104 and makes calls 106 to handler routines 108 in the programs when events 110 occur. The event notification facility 100 includes a program interface 112, for receiving the registration requests 102 and a registrations repository 114 for storing information regarding each registration request. The event notification facility 100 also includes an event interface 116 that is connected to event detection hardware and/or software (not shown and hereinafter referred to as the "mechanism that detected the event"), such as interrupt service routines within an operating system (not shown). When an event 110 occurs, the event interface 116 passes information describing the event to an event manager 118, which accesses the repository of registrations 114 to ascertain which (if any) program(s) 104 to notify of the event. For each such program 104, the event manager performs a procedure call 106 to the handler routine 108 of the program.

Figure 2:
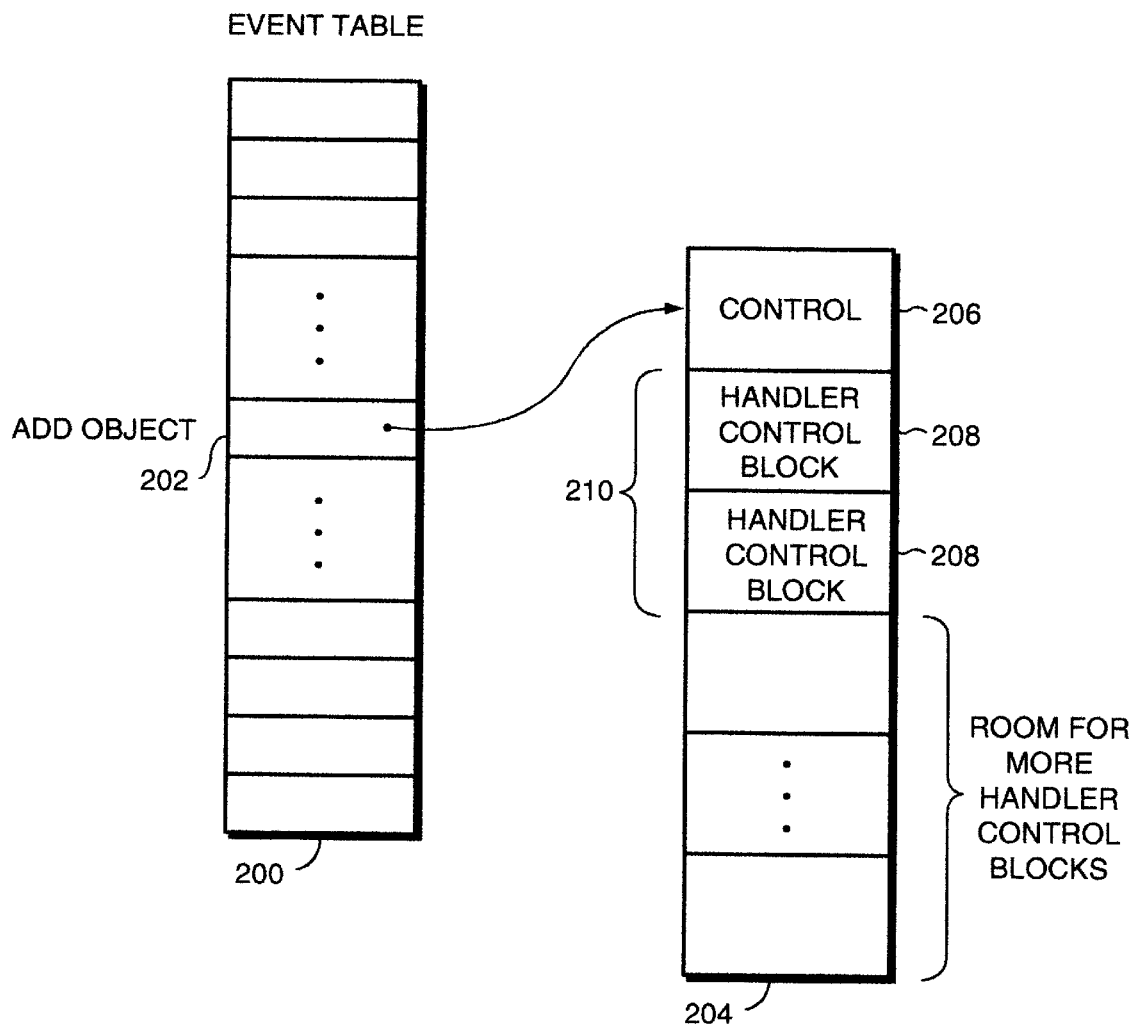
FIG. 2 is a diagram of data structures used by the event-notification facility of FIG. 1.

FIG. 2 is a more detailed diagram of the repository of registrations 114 (FIG. 1). Each entry of an event table 200 corresponds to a type of event 110, for example entry 202 corresponds to an "add object" event. Preferably, when the event notification facility 100 first begins executing, it creates the event table 200 with sufficient entries to accommodate events 110 that are expected to occur and the event notification facility thereafter increases the size of the table as needed. The event notification facility 100 allocates an expandable array, such as expandable array 204, for each event that has at least one registered program. The expandable array 204 has a control region 206 and room for several handler control blocks 208. When a program 104 (FIG. 1) registers for notification of an event 110, the program identifies a type of event and requests to be notified if and when an event of the identified type occurs. The program interface 112 checks the request for validity, e.g. whether the event table 200 contains an entry corresponding to the identified event type. If the request is for an event type that is not represented in the event table 200, additional entries are added to the event table and allocates another expandable array 204 is allocated. If the request is valid, the program interface 112 uses well-known techniques to allocate and fill in a handler control block 208 in the expandable array 204. The program interface 112 fills in the handler control block 208 in response to control information supplied by the registration request 102. The handler control blocks 208 thus form an ordered list 210.

Figure 3:
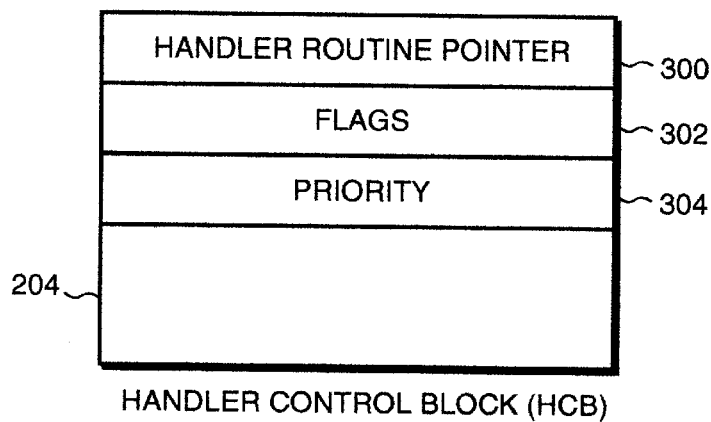
FIG. 3 s a more detailed diagram of one of the data structures of FIG. 2.

As shown in FIG. 3, a handler control block 208 contains several fields, including a handler routine pointer 300, which contains the address of the handler 108 (FIG. 1) that is to be called when the corresponding event 110 occurs.

A flags field 302 contains a flag that indicates whether the handler routine 108 is to be called last, i.e. after all the other handler routines represented by the other handler control blocks 208 that are located in the same expandable array 204. Preferably, a handler control block 208 that has this flag set is stored in the expandable array 204 further from the control region 206 than all other handler control blocks (hereinafter referred to as the "last handler control block in the expandable array") to facilitate calling the handler routine 108 last and to prevent another program 104 from registering to be notified of the same event last. When a program 104 requests that it be notified last, the program interface 112 examines the last handler control block in the expandable array 204. If that handler control block 208 has this flag set then the request is invalid because another program 104 has already requested to be notified last. Otherwise, the program interface 112 sets the flag in the newly-allocated handler control block 208.

If no handler control block 208 has the "last" flag set, the program interface 112 stores the newly-allocated handler control block in the expandable array 204 further from the control region 206 than all other handler control blocks. On the other hand, if the last handler control block in the expandable array 204 has its flag set, the program interface 112 links the newly-allocated handler control block between the last and the second-to-last handler control blocks. Thus handler control blocks 208 can be added to the list 210, but if the list contains a handler control block having its flag set, this latter handler control block remains the last handler control block in the expandable array. While the invention preferably uses an expandable array, other well-known linking, searching and inserting techniques, such as doubly-linked lists, can be used.

In an alternative embodiment, the flags field 302 contains one or more additional flags, which can control the circumstances under which the program 104 is to be notified when the associated event 110 occurs. These flags are filled in by the program interface 112 when it allocates and fills in the handler control block 208 and they can specify, e.g., that the handler 108 is to be called only if the event 110 represents a successful operation or, alternatively, a failed operation.

In an alternative embodiment, a priority field 304 controls sequencing and timing of the calls to the handlers 108. As with the flags field 302, the priority field 304 is filled in by the program interface 112 in response to a registration request 102. The priority field 304 contains one of three values representing, respectively, "in-line" notification, "journal" notification and "work" notification. "In-line" notification occurs synchronously with the event, i.e. when the event 110 occurs, a thread executes in the event interface 116. This thread transfers control to each handler 108 in turn and then it returns control to the mechanism that detected the event. In other words, the handlers 108 execute one at a time and all at the same time as the event 110. The event manager 118 uses the order of the handler control blocks 208 to ascertain the order in which to call the handlers 108. Optionally, each event 110 has an associated result value that is passed to each handler 108. Each handler 108 can modify this result value, which is then passed to the next handler. Thus, a handler 108 can force an otherwise-successful event to fail.

"Journal" and "work" notifications occur asynchronously with the event, i.e. the handlers 108 are called after the event 110 occurs, thus no result value modification is possible. Journal notifications occur in the order in which the handler control blocks 208 appear in the expandable array 204 and the handlers 108 are called sequentially by a single thread. Work notifications are unordered and several can occur simultaneously. Notably, each registration request 102 can specify a priority at which its notification is to be delivered, i.e. the priority of notification is program-selectable. All registrations for a single event need not specify the same priority.

It will therefore be seen that I have developed an event notification facility, which can be utilized with a variety of operating systems, events and programs. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, while the preferred embodiment notifies programs of the occurrence of an event by calling a handler routine, other previously-described mechanisms or combinations thereof can be used.

I claim:

1. An event notification facility for notifying one or more programs of an event, the event notification facility comprising:

(a) means for storing registration requests and for associating each registration request with a type of event, each registration request comprising:

(i) an identification of a mechanism for notifying one of the one or more programs (registered program) when the event occurs and (ii) control information that instructs the event notification facility whether to notify the registered program after notifying all other programs of the event (notify the registered program last);

(b) an interface, connected to the means for storing registration requests, for receiving registration requests from the one or more programs and for supplying the received requests to the storage means, each registration request from a requesting program comprising an identification of an event and control information that instructs the event notification facility whether to notify the requesting program last, wherein if the storage means already contains a registration request that instructs the event notification facility to notify one of the registered programs of the same event last, the interface rejects further registration requests that instruct the event notification facility to notify the requesting program last; and (c) means, connected to the means for storing registration requests, for notifying the registered programs when an event occurs, in accordance with the control information stored in the registration requests that are associated with the event.

2. The event notification facility defined in claim 1, wherein:

(b1) the interface for receiving registration requests from the one or more programs and for supplying the received requests to the storing means comprises means for receiving optional additional control information with each registration request from a requesting program and for supplying the optional additional control information to the storing means, the optional additional control information identifying circumstances under which the requesting program is to be notified when the identified event occurs; and (a1) the control information of each registration request stored by the storing means comprises the optional additional control information supplied by the interface.

3. The event notification facility defined in claim 1, wherein:

(a) information is associated with each event of at least one event type;

(b) when the notifying means notifies a registered program of an event, the notifying means sends the information associated with the event to the registered program; and (c) each registered program can modify the information that the registered program receives from the notifying means and the notifying means then sends the modified information to a registered program that is subsequently notified.

4. The event notification facility defined in claim 3, wherein the control information of each registration request from a requesting program comprises a priority that instructs the event notification facility whether to notify the requesting program synchronously with the associated event.

5. The event notification facility defined in claim 4, wherein the priority also instructs the event notification facility whether to notify the requesting programs in an order in which the requesting programs registered for notification.

6. The event notification facility defined in claim 5, wherein:

(b1) the interface for receiving registration requests from the one or more programs and for supplying the received requests to the storing means comprises means for receiving optional additional control information with each registration request from a requesting program and for supplying the optional additional control information to the storing means, the optional additional control information identifying circumstances under which the requesting program is to be notified when the identified event occurs; and (a1) the control information of each registration request stored by the storing means comprises the optional additional control information supplied by the interface.

7. The event notification facility defined in claim 6, wherein the notifying means notifies the registered programs by calling a handler routine.

8. The event notification facility defined in claim 6, wherein the notifying means notifies the registered programs by setting a flag.

9. The event notification facility defined in claim 6, wherein the notifying means notifies the registered programs by incrementing a counter.

10. The event notification facility defined in claim 6, wherein the notifying means notifies the registered programs by creating a process.

11. The event notification facility defined in claim 6, wherein the notifying means notifies the registered programs by unblocking a thread of execution.

12. The event notification facility defined in claim 6, wherein the storing means comprises an expandable array.

13. The event notification facility defined in claim 6, wherein the storing means comprises a linked list.

14. A memory device containing executable program instructions for an event notification system which notifies one or more registered programs of an event, said program instructions for:

receiving and storing a registration request from at least one of said registered programs and associating said registration request with a type of event, wherein said registration request identifies a mechanism for notifying the program which sent the request when the event occurs, and includes control information that instructs the event notification system whether to notify the program associated which sent the request last;

notifying at least one of said programs when an event occurs in accordance with said control information stored in said registration requests that are associated with the event; and if a registration request is already stored that instructs the event notification system to notify last one of the registered programs of the same event, rejecting further registration requests that instruct the event notification system to notify last the requesting program.

15. The memory device of claim 14, wherein the control information of each registration request from a program comprises a priority wherein program instructions for notifying at least one of said programs includes programs for notifying the program synchronously with the associated event.

16. The memory device of claim 15, wherein program instructions for notifying include program instructions for notifying the at least one of said programs based upon the order in which the one or more programs registered for notification.

17. The memory device of claim 16, wherein said program instructions for notifying includes program instructions for calling a handler routine.

18. The memory device of claim 16, wherein said program instructions for notifying includes programs instructions for a flag to notify the program of the event.

19. A memory device containing executable program instructions for an event notification system which notifies one or more programs which have registered with the event notification system of an event, said program instructions for;

receiving a registration request from at least one of the programs, wherein said registration request identifies a mechanism for notifying the program which sent the request when the event occurs, and includes control information that instructs the event notification system whether to notify the program which sent the request, last;

associating said registration request with a type of event;

storing said registration request;

notifying at least one of said programs when an event occurs in accordance with said control information stored in said registration requests that are associated with the event; and if a registration request is already stored that instructs the event notification system to notify last one of the registered programs of the same event, rejecting further registration requests that instruct the event notification system to notify last the requesting program.

20. The memory device of claim 19, wherein said program instructions for notifying includes program instruction for unblocking a thread of execution.

* * * * *